United States Patent [19]

Sutherland

[11] Patent Number: 5,404,767
[45] Date of Patent: Apr. 11, 1995

[54] OIL WELL PUMP POWER UNIT
[76] Inventor: James M. Sutherland, P.O. Box 2993, Grand Junction, Colo. 81502
[21] Appl. No.: 115,632
[22] Filed: Sep. 3, 1993
[51] Int. Cl.$^6$ ............................................. F16H 25/22
[52] U.S. Cl. ..................................... 74/89.15; 166/72; 254/92
[58] Field of Search ............... 74/89.15; 254/89 R, 254/92; 166/72; 417/362

[56] References Cited

U.S. PATENT DOCUMENTS

| | | | |
|---|---|---|---|
| 2,171,171 | 8/1939 | Brauer | 166/68 |
| 2,794,242 | 6/1957 | Evers et al. | 254/92 X |
| 3,517,910 | 6/1970 | Sutton et al. | 254/92 |
| 3,851,854 | 12/1974 | Roybal | 254/7 C |
| 4,128,019 | 12/1978 | Kupka | 74/89.15 X |
| 4,480,685 | 11/1984 | Gilbertson | 166/68.5 |
| 4,482,211 | 11/1984 | Fisher | 74/89.15 X |
| 4,655,291 | 4/1987 | Cox | 166/72 |
| 4,848,085 | 7/1989 | Rosman | 166/68 |
| 4,896,552 | 1/1990 | Virga | 74/89.15 |
| 4,995,278 | 2/1991 | Huang | 74/89.15 |
| 5,056,170 | 10/1991 | Kronshagen | 254/92 X |

FOREIGN PATENT DOCUMENTS 1207593  7/1986  Canada .
1299018  4/1992  Canada .
508625   7/1939  United Kingdom ............... 254/92

OTHER PUBLICATIONS

Rockford Ball Screws Catalogue, 1990 p. 2.
Ball Screws & Actuators Co. Inc. Catalog No. 91-2, about 1974; p. 9.

Primary Examiner—Allan D. Herrmann
Attorney, Agent, or Firm—Stevens, Davis, Miller & Mosher

[57] ABSTRACT

The oil well pump power unit is provided with a drive for reciprocating the sucker rod of an oil well pump. The rod (18) is fixed to a transverse beam (23) which is integral with ball nut housings (4), one at each end of the beam (23). The ball nuts (2) mounted in the housings (4) engage—in a frictionless, ball bearing type engagement—each a drive ball screw (1). The screws are driven concurrently by a drive motor. The advance in the art is in that this unit has a light weight and requires minimum driving power. Due to its light weight, it can easily be installed without special requirements for the foundation etc. Also, the maintenance is simple as all moving components are entirely enclosed in a housing (26) or protected by bellows (5, 6).

4 Claims, 5 Drawing Sheets

OIL WELL PUMP POWER UNIT

BACKGROUND OF THE INVENTION

The invention relates to a mechanical lifting mechanism wherein lift is accomplished through a continuous cyclic succession of vertical reciprocation. The invention is particularly related to a mechanism for vertical reciprocation involved in the pumped recovery of oil or water from a well casing.

Systems for developing a reciprocating motion in oil well pumps are known, e.g. from U.S. Pat. Nos. 2,171,171 (Braver) 4,848,085 (Rosman), 4,480,685 (Gilbertson) and other prior art references. These mechanisms are usually heavy for convenient transportation and they often require a complex operation control system which may render the operation unreliable. They also have a high energy consumption.

It is an object of the invention to improve the pumping systems available and in particular to reduce the size of the pumping units, to decrease the power demand needed to operate these units, to increase the operational reliability and reduce the space required to set up these units.

Another specific object is to eliminate the need for a derrick or pressure counter weight to support the pumping unit and to eliminate the need for any structure substantially taller than the stroke of the pump.

SUMMARY OF THE INVENTION

In general terms, the invention provides a mechanical lifting mechanism wherein lift is accomplished through a continuous cyclic succession of vertical reciprocation, said mechanism comprising, in combination:
  (a) a base cross-beam including securement means for fixedly securing the base cross-beam to an upper end of the respective housing;
  (b) an upper cross beam spaced from and, in operation, disposed above the base cross-beam;
  (c) at least two ball screws, spaced from each other, extending between the base cross-beam and the upper cross beam and pivotally secured to same;
  (d) a ball nut compatible and operatively associated with each said ball screw, each ball nut being secured in a ball nut housing;
  (e) said ball nut housings being fixedly secured to a travel beam extending between said housings;
  (f) said travel beam being provided with securement means for securing the travel beam to the respective reciprocating member;
  (g) drive means for interlockingly rotating the ball screws in alternating directions such that the respective ball nuts and thus the travel beam are all displaced in the same direction relative to the base cross-beam.

Specifically, but still defining the invention in general terms, the invention provides an oil-well derrick apparatus for generating a reciprocating motion of a sucker rod of a subsurface pumping piston in an oil-well casing, comprising, in combination:
  (a) a base cross-beam including securement means for fixedly securing the base cross-beam to an upper end of the respective oil-well casing;
  (b) an upper cross beam spaced from and, in operation, disposed above the base cross-beam;
  (c) at least two ball screws, spaced from each other, extending between the base cross-beam and the upper cross beam and pivotally secured to same;
  (d) a ball nut compatible with and operatively associated with each ball screw, each ball nut being secured in a ball nut housing;
  (e) said ball nut housings being secured to a travel beam;
  (f) said travel beam being provided with securement means for securing the travel beam to the respective sucker rod;
  (g) drive means for interlockingly rotating the ball screws such that the respective ball nuts and thus the travel beam are all displaced in the same direction relative to the base cross-beam.

BRIEF DESCRIPTION OF THE DRAWINGS

The invention will be illustratively described in connection with the accompanying diagrammatic drawings, in which.

DETAILED DESCRIPTION OF A PREFERRED EMBODIMENT

Figure 1:
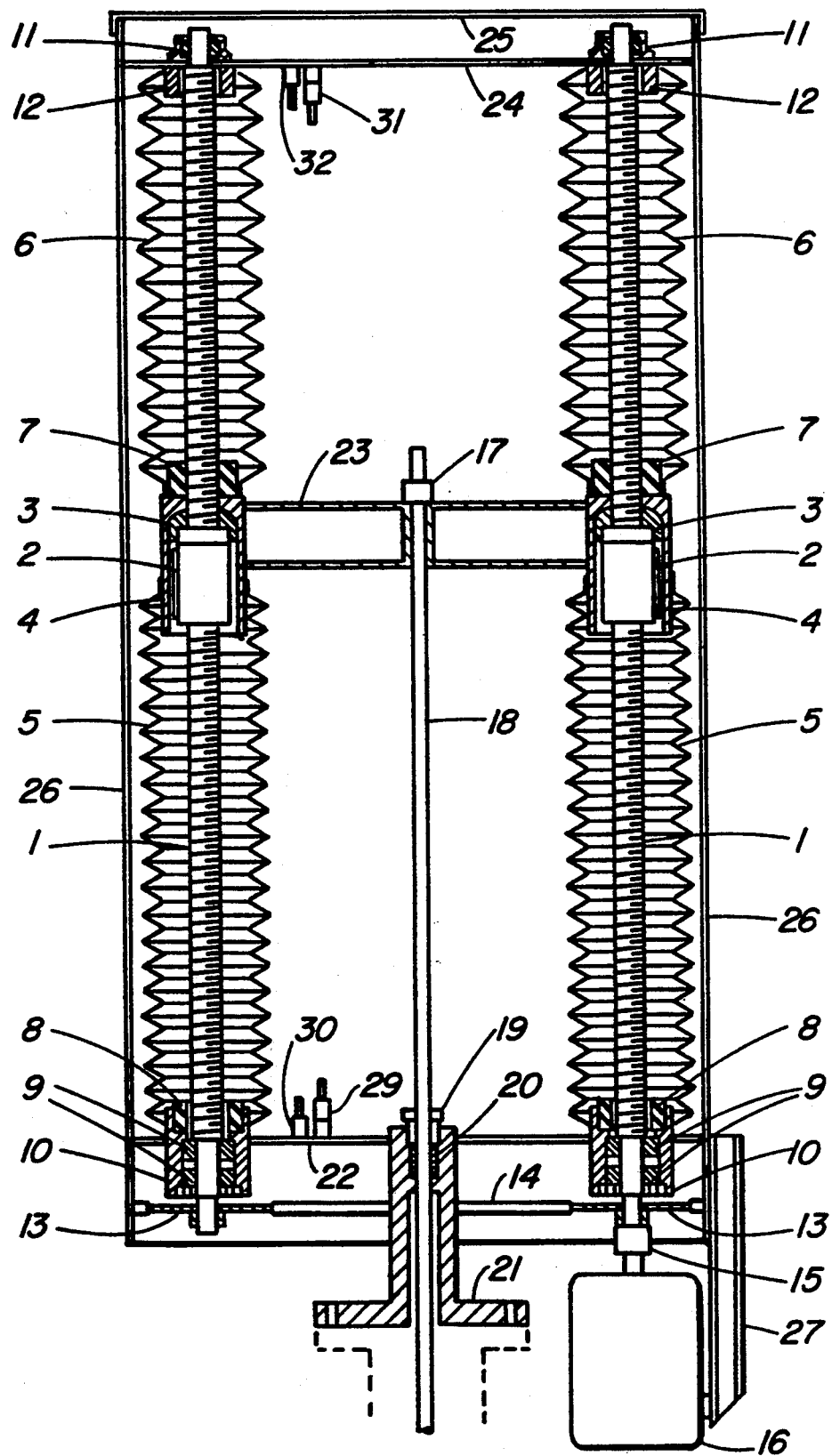
FIG. 1 is a cross section drawing of the working components of the pump power unit.
Figure 2:
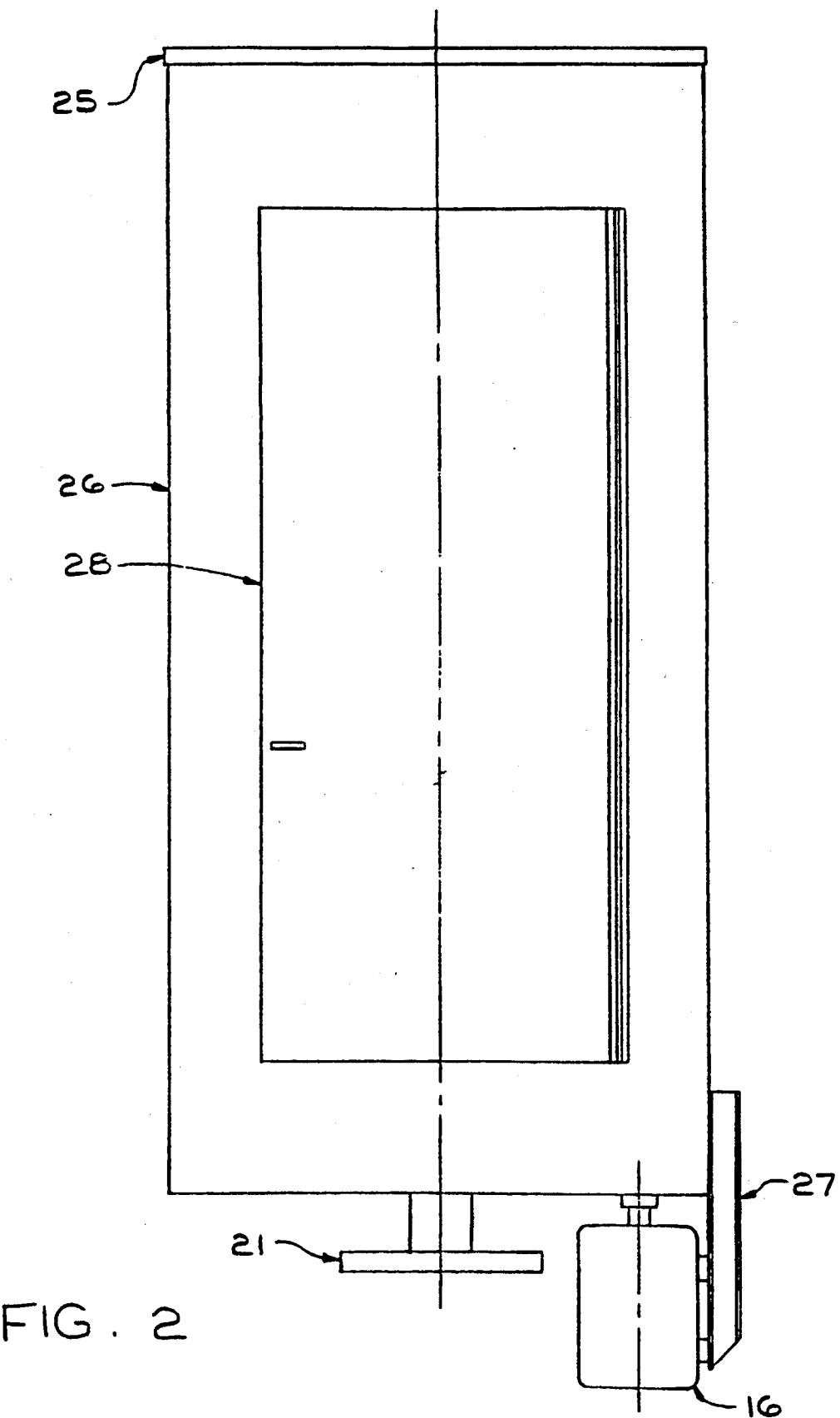
FIG. 2 is a front view of the finished working pump jack.
Figure 3:
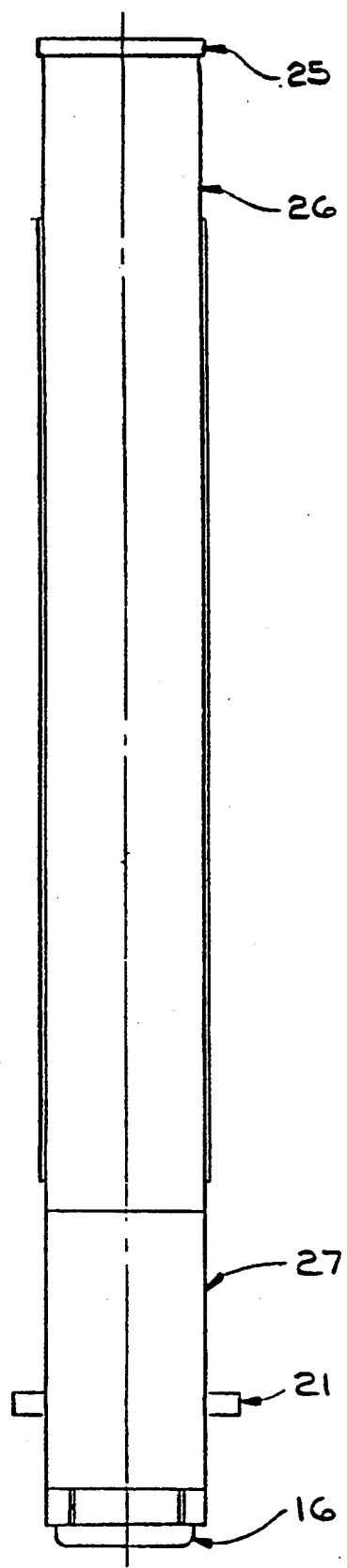
FIG. 3 is a side view of the finished working pump jack.
Figure 4:
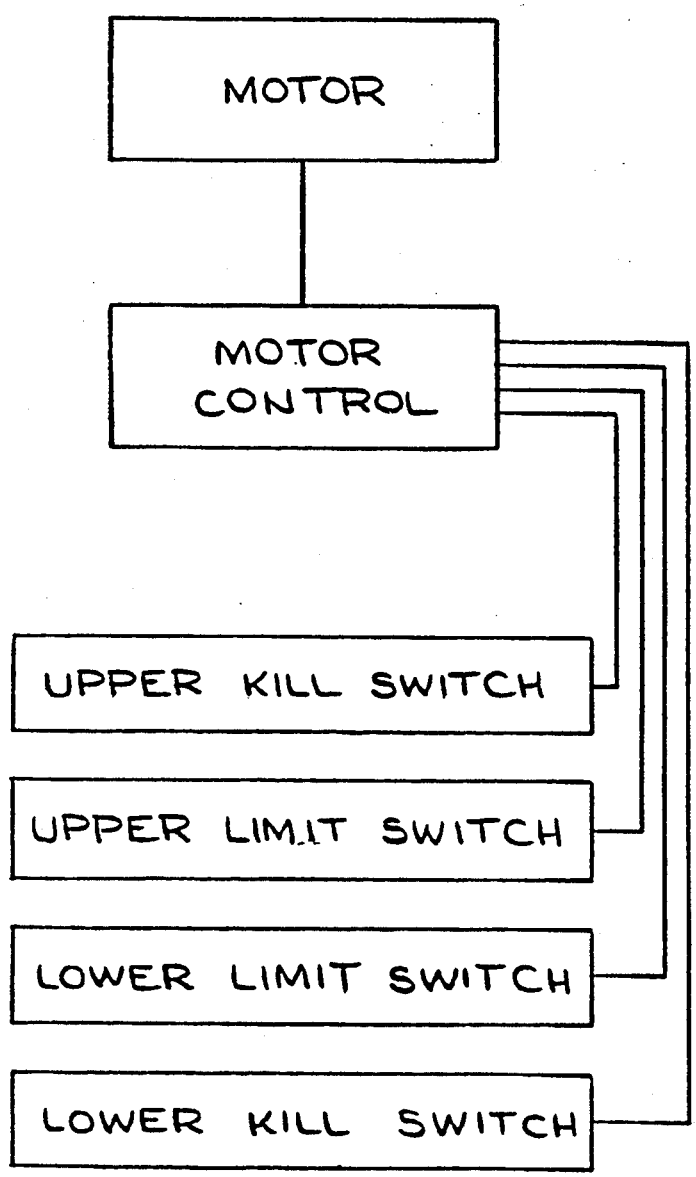
FIG. 4 is a simplified operation diagram showing the control circuit of the drive motor for use in the device of the present invention.

Referring initially to FIGS. 1, 2 and 3, the invention is shown as it would be connected to a well by means of a mounting flange 21 at the wellhead. In this flange there is packing 20 to contain the oil or water in the wellhead and a gland nut 19 to adjust the packing tension to the sucker rod 18 as it is drawn up. A lower cross beam 22 is fixedly secured to this flange 21 and forms a part of the overall housing with the side supports or walls 26 and an upper beam 24. The complete housing unit is fully enclosed with a top 25 and door 28 (FIG. 2) to keep contaminants out such as rain, snow or dirt.

Attached to the lower cross beam 22 and to the upper cross beam 24, by means of bearings are ball screws 1. The lower bearings 9 are mounted in bearing housings 10 on the lower beam 22. The upper bearings of the ball screws are pillow block bearings 11 on the upper beam 24.

To the ball screws 1 a travel beam 23 is attached between the upper beam 24 and the lower beam 22. It has, at each end thereof, a ball nut 2 mounted in a housing 4 to attach it to the ball screw 1. This connection is later described in greater detail with reference to FIG. 5.

The travel beam 23 is adapted to move the sucker rod 18 up when the screws 1 are rotated in one direction. The rod 18 is allowed to slide down by its weight and by the weight of components acting on the rod 18, in a controlled fashion when the ball screws 1 are driven in the opposite direction.

In the embodiment shown, there is a chain transmission used in interlockingly driving both screws 1 in the same sense and at the same speed. A coupling 15 connects a motor 16 to a first chain sprocket 13 keyed to the first screw 1 at the right hand side of FIG. 1. A chain 14 is engaged with the first sprocket and with a second sprocket 13 at the left of FIG. 1, which is likewise keyed to the other screw 1. The motor 16 is attached to the main housing 26 by means of a motor bracket 27.

The sucker rod 18 is attached to the travel beam 23 with a nut 17. The travel of the travel beam 23 is limited on the down stroke by a limit switch 29 that is attached to the lower beam 22 and on the up stroke by a limit switch 31 attached to the upper beam 24. Should these switches fail there are kill switches 32 and 30 attached to the upper and lower beams 24 and 22. As an additional precaution, urethane bumpers 7 and 8 are installed to come in contact with either the upper stop 12 or the ball nut housing 4.

Figure 5:
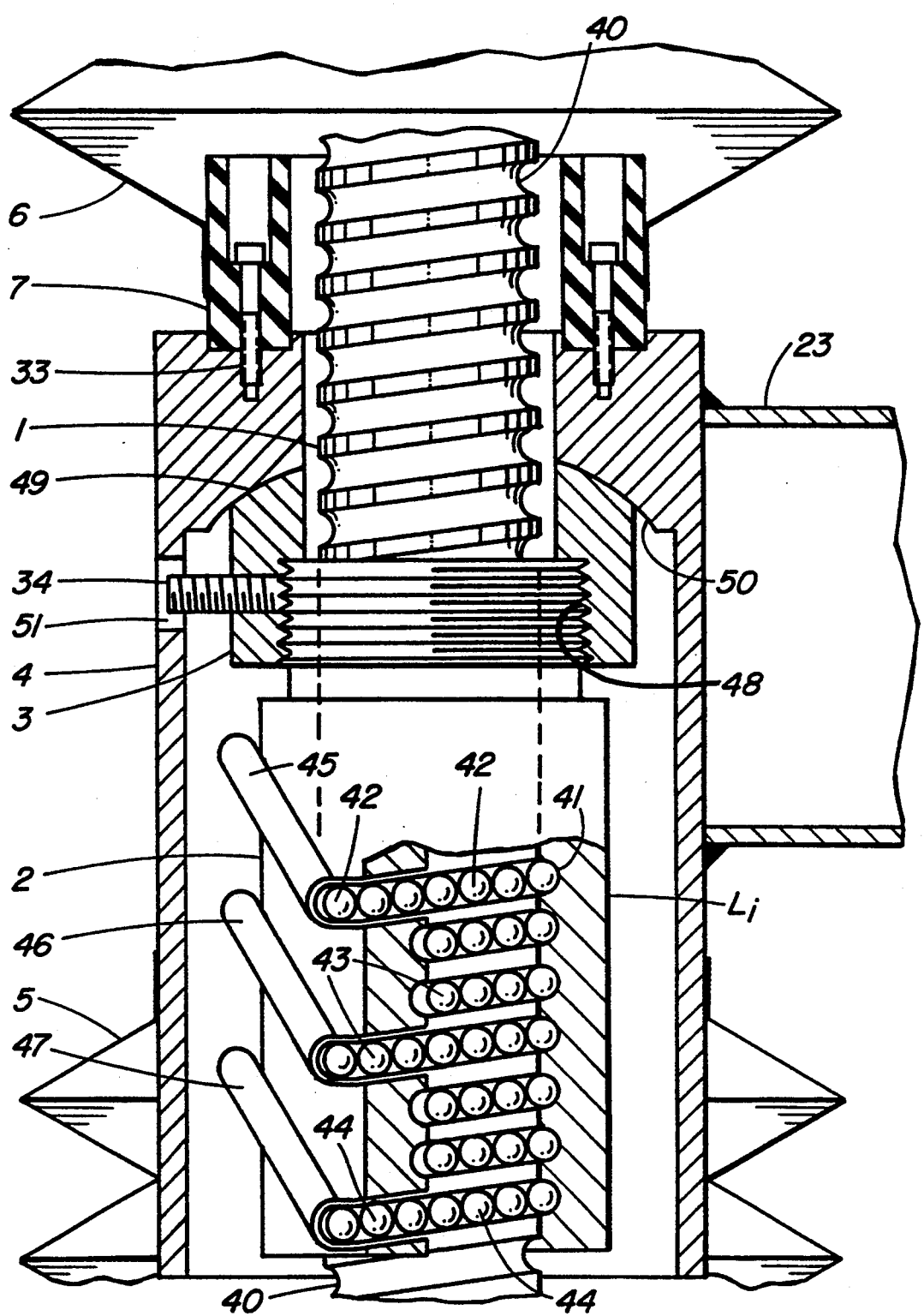
FIG. 5 is a diagrammatic representation showing a typical arrangement of one of the ball screws of the present invention.

The mounting of the ball nuts 2 in their respective housings 4 is shown partly in FIG. 1 and in greater detail in FIG. 5. Before turning to the representation of FIG. 5 it should be noted that the ball nut 2 is shown in a partial section which is not on the same line as the sectional representation of the remaining components, the latter being in the plane of the drawing. The partial section of the ball nut 2, on the other hand, is on an inclined plane which intersects the plane of the drawing of FIG. 5 along the line of intersection $L_i$, the section plane being parallel with the axis of the screw 1 and being inclined upwardly and toward the left of the line $L_i$ of FIG. 5.

A spherical adaptor 3 is installed between each ball nut 2 and its associated housing 4, to allow for misalignment between the ball screw I and the ball nut 2 during travel. As an additional precaution against dust or contaminants, bellows 5 and 6 are installed over the ball screws 1 between the upper and lower beams 24 and 22.

As shown in FIG. 5, the ball screw is a simple device for transmitting power mechanically. Threaded on the ball screw 1 is a ball nut 2. The screw 1 and the nut 2 have matching helical grooves or races 40, 41, respectively. There is no physical contact between the grooves 41 of the nut and those 40 of the screw 1. Instead, there is a plurality of bearing balls, each disposed in one of ball recirculation systems 42, 43, 44. Each recirculation system has a deflector tube 45, 46, 47. The deflector tubes 45–47 are adapted to recirculate the balls of the respective system. As the balls of the systems 42, 43, 44 reach the trailing end of the system, they are guided by the respective deflector tube 42, 43, 44 to the leading end of the respective system to resume the rolling function. Thus, the balls recirculate continuously in one direction or the other, depending upon the instant rotation of the screw 1 relative to the ball 2.

Each nut 2 is fixedly threaded at 48 at its normally upper end to the spherical adaptor 3. A setscrew 34 passes through a threaded passage in the side of the ball adaptor 3 to lock the threaded connection 48 in order to prevent inadvertent release of the nut 2 from the adaptor 3.

The upper end of the adaptor 3 is convexly rounded at 49, at a convexity matching the shape of a concave surface 50 machined at the interior of the housing 4. Thus, the adaptor 3 can adapt to an instant misalignment which may occur during the operation of the mechanism.

A setscrew 34 passes through a vertical slot 51 in the side wall of the housing 4, thus allowing, on misalignment, the tilting motion of the adaptor 3 and thus nut 2, but not a turning motion of the nut 2 about the axis of the screw 1. The housing 4 itself is, of course, prevented from rotation relative to the associated screw 1 by virtue of its integral connection, e.g. by welding, to the travel beam 23 which thus provides a fixed, rigid connection between the two housings 4 at the ends of beam 23.

In operation, the entire unit, disposed in the box-shaped housing, is secured to the well by the flange 21. The control circuitry of the electric motor 16 is connected to a source of electric power.

In the "up" mode, the motor control is actuated to turn the screws 1 in a first direction. This mode continues until the beam 23 (or a suitable projection thereon) actuates the switch 31. The switch 31 causes the motor control to reverse the rotation of the drive motor 16 and thus of the screws 1. The weight of the rod 18 and its associated parts subjects the beam to a continued downward force vector with the result that the rod moves slowly down depending on the speed of rotation of the motor 16.

At the lower end of the travel, the lower part of the beam 23 actuates switch 29 which results in that the motor control is activated to instantly reverse the direction of rotation of the motor 16 and the upward mode is again restored until the upper switch 31 is actuated again.

As a safety feature, the shut-off switches 32 and 30 at the upper and lower end of the travel are adapted to activate the motor control such that the motor is stopped instantly, before mechanical damage or the like may occur due to failure to any one of the reverse switches 31 or 29.

The ball screw mechanism is an efficient converter of rotary to linear motion. While it is a member of power transmission screws, it possesses many more important engineering advantages than conventional screws as well as hydraulic and other means of power transmission.

The ball screw has mechanical efficiency of 90% which permits the use of a much smaller power source resulting in a saving in space and operating expense. This is due to the difference between rolling contact and sliding contact.

Compared with known hydraulic oil well pumping units, (U.S. Pat. No. 4,480,685—Gilbertson) the rolling contact eliminates stutter when pump is started or direction is changed. Ball screws operate with total reliability in all environments which can be encountered in an oil field. Conditions such as extreme temperatures and dirty dusty atmosphere do not give rise to serious concern as all elements are easily protected by bellows and by an enclosed housing as shown. Also, ball screws typically can operate between $-65°$ F. and $300°$ F.

Another advantage to a ball screw system is the operational wear predictability when given the operating conditions. The load life relationship is determined in the same manner as the bearing industry rates ball bearings. This B10 life means that 10% of the units could fail before reaching the required travel (at rated load) and that 50% of the units will exceed five times the rated travel. This relationship is based on the inverse cube ratio, meaning that if a unit operates at half the rated load, the life of the unit increase eight times. In my design I have allowed for a less than 25% of the rated load on the ball screw.

Maintenance is minimal only requiring lubrication periodically with a light oil or a fine grease. This can be accomplished with an automatic oiler on every stroke (not shown in the drawings).

A better understanding of the merit of the invention can be derived from consideration of a known conventional system and a hydraulic system as compared with the ball screw system wherein each system has the capacity to pump 400 barrels of oil or water per day from a subsurface depth of 5000 feet.

The conventional system is a so-called "walking beam" system (Canadian Patent 1,299,018) wherein a prime mover motor must angularly oscillate the beam in simple-harmonic cycles of reciprocating the polish rod connected to the beam. For the walking beam to achieve the indicated 400 barrel output from the indicated depth, the prime mover must be of 75 hp capacity.

The hydraulic system consisting of a double hydraulic cylinder and an "A" frame design with cables pulleys and pressure accumulator (U.S. Pat. No. 4,848,085—Roonsman) would require a prime mover of 25 hp. On the other hand, the ball screw system would require a prime mover of only 5 hp.

Other advantages of the ball screw over the hydraulic pump jack is the elimination of the need for additional support. To achieve the same lifting result the hydraulic unit needs an "A" frame to handle the weight of the oil or water and the rods and stabilize the unit. This would require a lot of site preparation and the construction of a cement basement at the well location adding to the installation cost and the time required to install the unit, as well as additional cost to manufacture the pump jack.

The ball screw pump jack is attached directly to the well head by means of a flange and with this compact design and light weight of only 2500 lbs. it needs no additional support making this the most efficient use of space.

There is no need for pressure accumulators that the hydraulic unit needs to achieve the reciprocating lift of rods and oil in this type of system a pressure accumulator is necessary to keep the unit running at a constant rate without the accumulator the horse power requirement would be much greater. The ball screw unit uses the efficiently of the ball bearing to achieve this lift and as it is so much more efficient it needs no additional power to be generated from the down stroke, thus there is no delay when the unit changes direction.

Another advantage over the hydraulic unit is maintenance. With the hydraulic unit, changes in weather or temperature will most certainly cause the unit to operate less efficiently. As the hydraulic oil changes consistency due to temperature change, the hydraulic unit will operate different pumping slower in cold weather. In hot weather the unit will most certainly leak oil from cylinder packing and exposed fittings. Another problem with the hydraulic unit is hydraulic oil contamination either from condensation or atmospheric moisture. Any moisture that should become trapped in the system could freeze and causing a cylinder to rupture or fail. This would also cause the cylinder to travel at different rates during the pumping operation and cause additional side stress to the polish rod.

The ball screw unit operates with the same efficiency over a much wider range of temperature conditions and there is nothing that can leak or become contaminated.

Those skilled in the art will appreciate that the exemplary embodiment disclosed above may be modified to a greater or lesser degree without departing from the scope of the present invention. Accordingly, I wish to protect by Letters Patent which may issue on this application all such embodiments that fall within the scope of my contribution to the art.

I claim:

1. A driving mechanism for inducing a continuously reciprocating motion to a reciprocative member, said mechanism including, in combination:
   (a) a base cross-beam including securement means for fixedly securing the base cross-beam to an upper end of a casing;
   (b) an upper cross beam spaced from and, in operation, disposed above the base cross-beam;
   (c) at least two ball screws, transversely spaced from each other, extending between the base cross-beam and the upper cross beam and pivotally secured to same;
   (d) a ball nut compatible with and operatively associated with each said ball screws, each ball nut being secured in a ball nut housing;
   (e) said ball nut housings being fixedly secured to end portions of a travel beam;
   (f) said travel beam being provided with securement means for securing the travel beam to the respective reciprocative member, said securement means being disposed at a minimum equidistant spacing from said ball screws,
   (g) drive means for interlockingly rotating the ball screws in alternating directions such that the respective ball nuts and thus the travel beam are all displaced along the screws in the same reciprocative direction.

2. Oil-well derrick apparatus for generating a continuously reciprocating motion of a sucker rod of a subsurface pumping piston in an oil-well casing, comprising, in combination:
   (a) a base cross-beam including securement means for fixedly securing the base cross-beam to an upper end of the respective oil-well casing;
   (b) an upper cross beam spaced from and, in operation, disposed above the base cross-beam;
   (c) at least two ball screws, transversely spaced from each other, extending between the base cross-beam and the upper cross beam, and being pivotally secured to both said cross-beams;
   (d) a ball nut compatible with and operatively associated with each ball screw, each ball nut being secured in a ball nut housing;
   (e) said ball nut housings being fixedly secured to a travel beam;
   (f) said travel beam being provided with securement means for securing the travel beam to the respective sucker rod;
   (g) drive means for interlockingly rotating the ball screws in alternating directions such that the respective ball nuts and thus the travel beam are all displaced in the same alternating vertical direction relative to the base cross-beam.

3. Apparatus of claim 2, wherein said upper and lower beams and said travel beam, including said ball screws and ball nuts are all located within a housing comprised of two telescopically arranged housing portions, one of each of said portions being fixedly secured to said upper beam and the other to said lower beam.

4. Apparatus of claim 3, further comprising protective bellows extending about those portions of each ball screw which are disposed above and below the travel beam.

* * * * *